US007536069B2

(12) United States Patent
McNab et al.

(10) Patent No.: US 7,536,069 B2
(45) Date of Patent: *May 19, 2009

(54) METHOD AND APPARATUS FOR RESONANT COUPLING IN PHOTONIC CRYSTAL CIRCUITS

(75) Inventors: Sharee J. McNab, Christchurch (NZ); Yurii A. Vlasov, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/743,454

(22) Filed: May 2, 2007

(65) Prior Publication Data

US 2007/0201804 A1 Aug. 30, 2007

Related U.S. Application Data

(63) Continuation of application No. 11/073,236, filed on Mar. 4, 2005, now Pat. No. 7,228,042.

(51) Int. Cl.
   G02B 6/12 (2006.01)
   G02B 6/26 (2006.01)
   G02B 6/10 (2006.01)

(52) U.S. Cl. ............................. 385/28; 385/14; 385/39; 385/132

(58) Field of Classification Search .................. 385/14, 385/129, 15, 27, 50, 28, 39
   See application file for complete search history.

(56) References Cited

U.S. PATENT DOCUMENTS

| 5,526,449 | A | 6/1996 | Meade et al. | |
|---|---|---|---|---|
| 6,687,447 | B2 * | 2/2004 | Flory et al. | 385/129 |
| 6,738,551 | B2 | 5/2004 | Noda et al. | |
| 6,996,319 | B2 * | 2/2006 | Noda et al. | 385/129 |
| 2004/0001683 | A1 | 1/2004 | Lau et al. | |
| 2004/0258383 | A1 | 12/2004 | Sato et al. | |

OTHER PUBLICATIONS

Asano, et al., "Investigation of a channel-add/drop-filtering device using acceptor-type point defects in a two-dimensional photonic-crystal slab," Applied Physics Letters, vol. 83, No. 3, Jul. 21, 2003.
Akahane, et al., "High-Q photonic nanocavity in a two-dimensional photonic crystal," Nature, vol. 425, Oct. 30, 2003, 944-947.

(Continued)

*Primary Examiner*—Charlie Peng

(57) ABSTRACT

The present invention is a method and an apparatus for resonant coupling in photonic crystal circuits. In one embodiment, a photonic crystal device comprises a substrate having a plurality of apertures formed therethrough, a photonic crystal circuit (e.g., formed by "removing" a series of apertures), and a strip waveguide extending through the apertures and coupled to the photonic crystal circuit via a surface localized photonic state formed at a surface of the photonic crystal (e.g., in the apertures). The surface localized photonic state facilitates the efficient resonant tunneling of photons from the wavelength-independent strip waveguide to the wavelength-selective photonic crystal circuit, thereby improving the filtering capabilities of the photonic crystal device.

12 Claims, 4 Drawing Sheets

OTHER PUBLICATIONS

Noda, et al., "Trapping and emission of photons by a single defect in an photonic bondage structure," Nature, vol. 407, Oct. 5, 2000, 608-610.

Song, et al., "Photonic Devices Based on In-Plane Hetero Photonic Crystals," Science, vol. 300, Jun. 6, 2003, 1537.

Vlasov, et al., "Mode Mixing in asymmetric double-trench photonic crystal waveguides," J. Applied Physics, 95(9), May 1, 2004, 4538-4544.

Vlasov, et al., "Observation of surface states in a truncated photonic crystal slab," Optics Letters, 29(18) Sep. 15, 2004, 2175-2177.

* cited by examiner

METHOD AND APPARATUS FOR RESONANT COUPLING IN PHOTONIC CRYSTAL CIRCUITS

CROSS REFERENCE TO RELATED APPLICATIONS

This application is a continuation of U.S. patent application Ser. No. 11/073,236, filed Mar. 4, 2005, now U.S. Pat No.7,228,042 which is herein incorporated by reference in its entirety.

BACKGROUND

The invention relates generally to photonic crystals, and relates more particularly to resonant coupling in photonic crystal circuits.

FIG. 1 is a perspective view illustrating a conventional photonic crystal device 100, e.g., configured for use as a resonant cavity filter. Specifically, the photonic crystal device 100 comprises a substrate 102, a periodic lattice comprising a plurality of apertures 104 formed through the substrate, an optical cavity 106 formed within the periodic lattice (e.g., by omitting a series of apertures), and a photonic crystal waveguide 108 also formed within the periodic lattice and side-coupled to the optical cavity 106.

In operation, light 110 comprising a plurality of signals (e.g., $f_1$, $f_2$, . . . , $f_n$) at different wavelengths enters the photonic crystal waveguide 108, which functions as a waveguide bus. As the light 110 approaches the side-coupled optical cavity 106, which typically has very strong wavelength selectivity, signals 112 of a certain wavelength or wavelengths (e.g., $f_i$) will be filtered or coupled to the optical cavity 106, while the remainder of the light 110 continues to propagate through the waveguide bus 108.

A problem with such a configuration is that while the waveguide bus should ideally have wavelength-independent properties for optimal filtering performance, photonic crystal waveguides such as those used for the waveguide bus actually tend to have very strong wavelength selectivity, both in amplitude transmission and in phase sensitivity. Specifically, large group velocity dispersion, which can distort optical pulses propagating along the waveguide bus, and very small bandwidth for low-loss propagation are inherent properties of photonic crystal waveguides. Thus, they are not ideal for use as waveguide buses, e.g., as used in resonant cavity filtering.

Thus, there is a need for a method and an apparatus for resonant coupling in photonic crystal circuits.

SUMMARY OF THE INVENTION

The present invention is a method and an apparatus for resonant coupling in photonic crystal circuits. In one embodiment, a photonic crystal device comprises a substrate having a plurality of apertures formed therethrough, a photonic crystal circuit (e.g., formed by "removing" a series of apertures), and a strip waveguide extending through the apertures and coupled to the photonic crystal circuit via a surface localized photonic state formed at a surface of the photonic crystal (e.g., in the apertures). The surface localized photonic state facilitates the efficient resonant tunneling of photons from the wavelength-independent strip waveguide to the wavelength-selective photonic crystal circuit, thereby improving the filtering capabilities of the photonic crystal device.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for resonant coupling in photonic crystal circuits. Embodiments of the present invention enable more efficient resonant coupling by providing a substantially wavelength-independent strip waveguide coupled to a wavelength-selective photonic crystal circuit (such as an optical cavity). A surface localized photonic state produced between the strip waveguide and the photonic crystal circuit enhances the feasibility of using a strip waveguide in this manner by facilitating efficient resonant tunneling of photons from the strip waveguide to the photonic crystal circuit.

Figure 1:
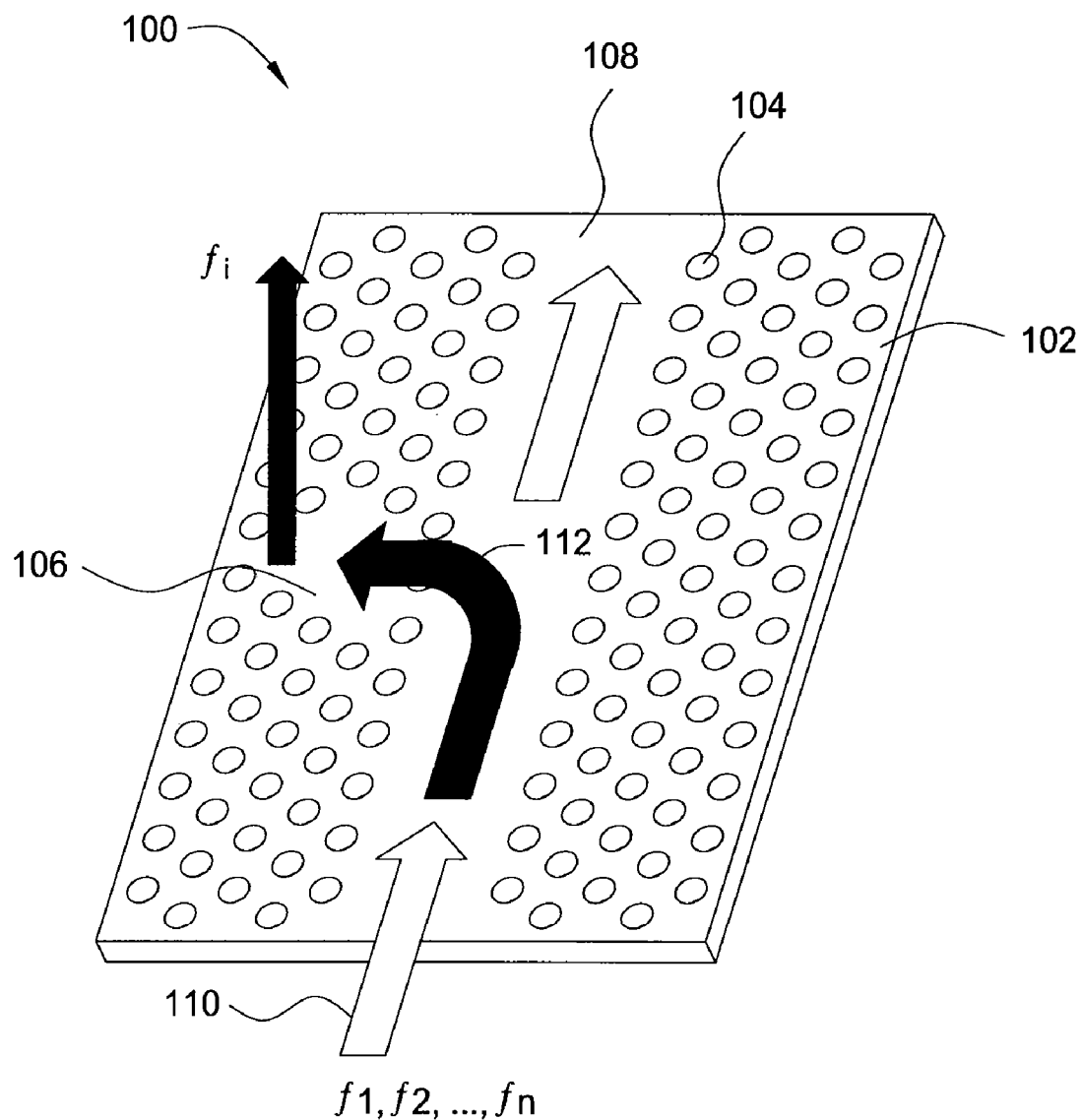
FIG. 1 is a perspective view illustrating a conventional photonic crystal device, e.g., configured for use as a resonant cavity filter.
Figure 2:
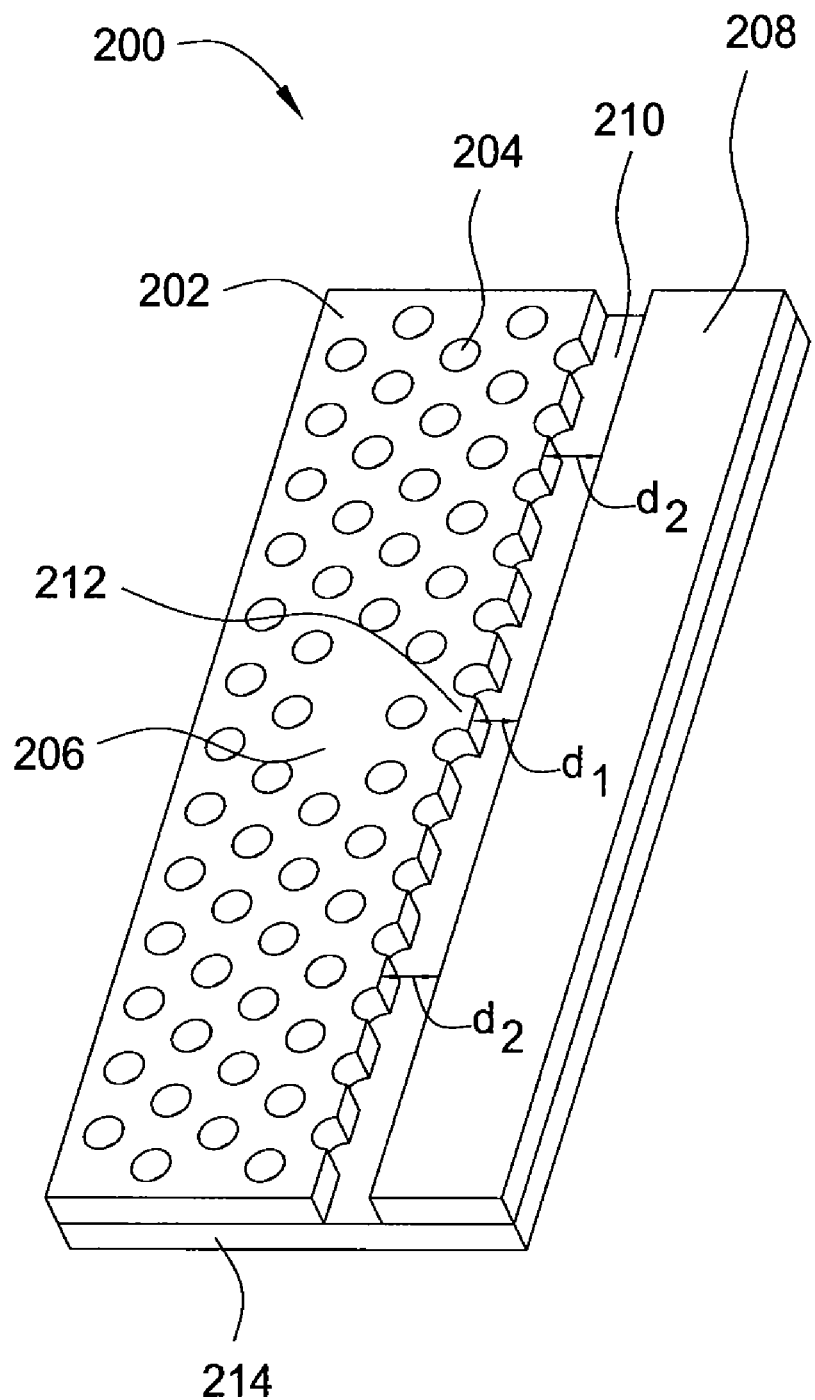
FIG. 2 is a perspective view illustrating one embodiment of a photonic crystal device that may be implemented for use as a resonant cavity filter, according to the present invention.

FIG. 2 is a perspective view illustrating one embodiment of a photonic crystal device 200 that may be implemented for use as a resonant cavity filter, according to the present invention. The photonic crystal device 200 shares some similarities with the photonic crystal device 100 illustrated in FIG. 1 and comprises a substrate 202, a periodic lattice comprising a plurality of apertures 204 formed through the substrate and at least one photonic crystal circuit 206 formed within the periodic lattice (e.g., formed in FIG. 2 as an optical cavity by omitting a series of apertures 204). In one embodiment, a substantially solid sub-layer 214 is disposed beneath the periodic lattice and photonic crystal circuit 206.

Instead of a photonic crystal waveguide (e.g., as illustrated in FIG. 1), the photonic crystal device 200 further comprises a strip waveguide 208 coupled (e.g., side-coupled) to the photonic crystal circuit 206, e.g., as a waveguide bus. The strip waveguide 208 is characterized by substantially wavelength-independent properties, including substantially linear dispersion and a very broad bandwidth of low-loss propagation. As such, the strip waveguide 208 can function as an effective waveguide bus for transporting signals of various wavelengths.

In one embodiment, the substrate 202 is formed from a high refractive index material. The magnitude of the refractive index is a relative value; i.e., the substrate material 202 has a high refractive index relative to the refractive indices of the apertures 204, and in one embodiment, the refractive index contrast is greater than 1:1. Suitable high refractive index materials include, but are not limited to, Group IV materials (including silicon, carbon, germanium and alloys thereof, among others), Group III-VI materials (including gallium arsenide, gallium phosphide, indium phosphide, indium arsenide, indium antimonide, and alloys thereof, among others), and Group II-IV materials (including zinc oxide, zinc sulfide, cadmium sulfide, cadmium selenide, cadmium tellurium, and alloys thereof, among others). Forms of silicon that may be used include single crystalline, polycrystalline and amorphous forms of silicon, among others. Polysilicon or amorphous silicon may be particularly advantageous for applications where cost and ease of fabrication and process integration are concerns. In addition, metals such as aluminum, tungsten, gold, silver and palladium, among others, as well as semiconductors may be used to advantage.

In one embodiment, the apertures 204 forming the periodic lattice extend substantially completely through the substrate 202 to the sub-layer 214. The strip waveguide 208 is positioned to extend through the lattice structure created by the apertures 204 (e.g., like a channel) and in one embodiment has a substantially rectangular cross section. In one embodiment, the strip waveguide 208 has a refractive index that substantially matches the refractive index of the substrate 202.

In one embodiment, the strip waveguide 208 is physically separated from a portion of the periodic lattice by a trench 210 etched along a longitudinal side of the strip waveguide 208. Thus, the trench 210 forms an air gap between the periodic lattice and the strip waveguide 208.

As illustrated, the trench 210 further separates the strip waveguide 208 from the photonic crystal circuit 206, as well as from the portion of the periodic lattice surrounding the photonic crystal circuit 206. As illustrated, the trench 210 intersects a row of apertures 204 facing the strip waveguide 208 such that the periodic lattice is truncated. As further illustrated, the periodic lattice is truncated by the trench 210 in an irregular manner, such that the degree of truncation is unique in a coupling region 212 of the periodic lattice that is substantially situated between the strip waveguide 208 and the photonic crystal circuit 206. Specifically, the trench 210 truncates the periodic lattice such that a distance $d_1$ separating the coupling region 212 of the periodic lattice from the strip waveguide 208 is different than a distance $d_2$ separating the remainder of the periodic lattice from the strip waveguide. This local change in the truncation of the periodic lattice (in the coupling region 212) facilitates efficient coupling of a waveguiding mode in the strip waveguide 208 to an optical mode in the photonic crystal circuit 206, as discussed in greater detail below.

Specifically, the use of a strip waveguide 208 as the waveguide bus results in a wide air gap between the waveguide bus and the photonic crystal circuit 206 (e.g., the trench 210 forms this gap, having a width of $d_1$ along most of its length). This wide air gap would typically make coupling of the photonic crystal circuit 206 to the strip waveguide 208 less efficient than is optimal for filtering purposes. However, by locally changing the truncation of the periodic lattice in the coupling region 212 as described above, an intermediate resonance or surface localized photonic state is created, at the surface of the periodic lattice, between the strip waveguide 208 and the photonic crystal circuit 206. This surface localized photonic state facilitates resonant tunneling of photons from the strip waveguide 208 to the photonic crystal circuit 206. The dispersion and resonant frequency of this surface localized photonic state is determined at least in part by the specific truncation of the periodic lattice. Thus, in one embodiment, the surface localized photonic state, which is strongly localized to the surface of the periodic lattice, is determined in accordance with a specific truncation of the periodic lattice. In one embodiment, the periodic lattice is truncated such that the resultant surface localized photonic state is tuned in resonance with the state of the photonic crystal circuit 206.

Figure 3:
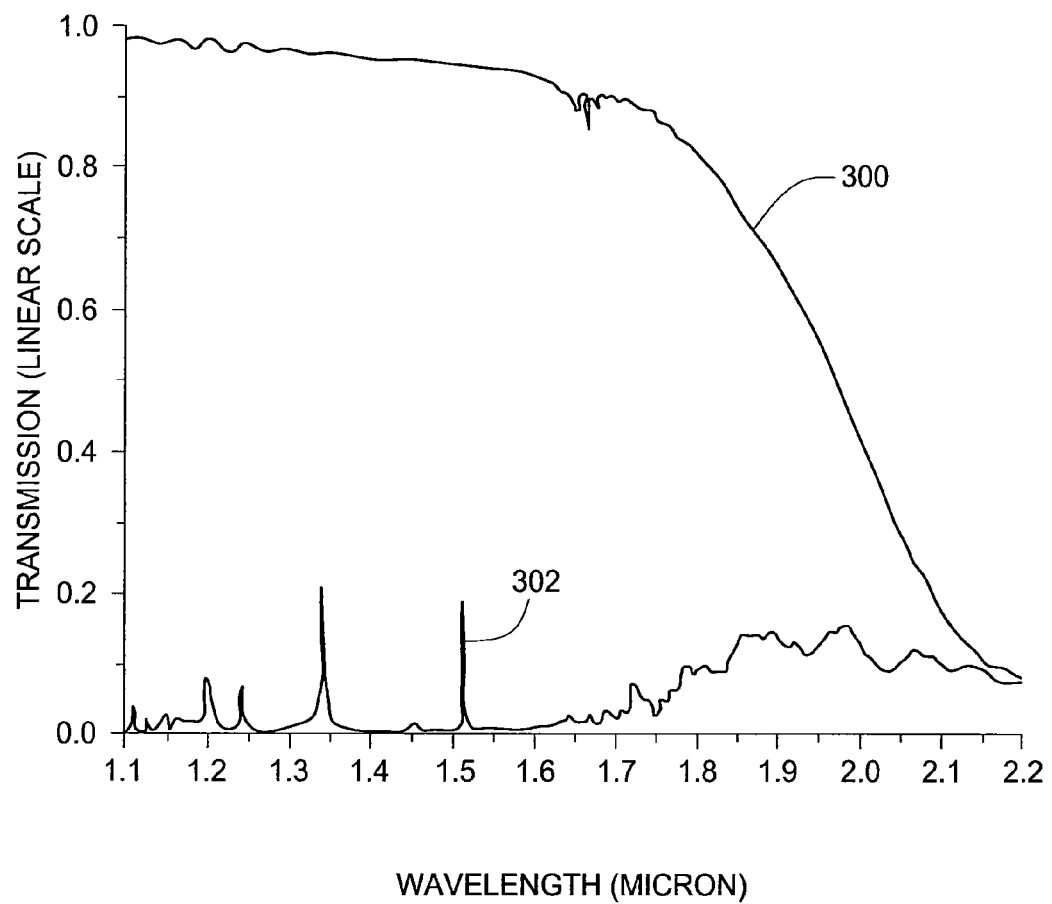
FIG. 3 is a graph illustrating the amplitude of resonance or light (in dB) versus the wavelength (in micron) for transmissions in a photonic crystal device similar to the photonic crystal device of FIG. 2, but lacking the means to produce surface localized photonic states in the coupling region.

FIG. 3 is a graph illustrating the amplitude of resonance or light (in linear scale) versus the wavelength (in micron) for transmissions in a photonic crystal device similar to the photonic crystal device 200, but lacking the means to produce surface localized photonic states in the coupling region 212 (e.g., the hypothetical photonic crystal device exhibits a uniform or even truncation of the periodic lattice along the length of the trench). Specifically, FIG. 3 illustrates the behavior of both the strip waveguide transmission 300 and the light build-up 302 in the photonic crystal circuit of the photonic crystal device.

As illustrated, the photonic crystal circuit mode (e.g., illustrated at approximately 1.53 micron) is associated with a relatively small amplitude of light build-up (e.g., having a normalized amplitude of approximately 0.2). This implies that coupling between the strip waveguide and the photonic crystal circuit is not efficient for optical filtering purposes.

Figure 4:
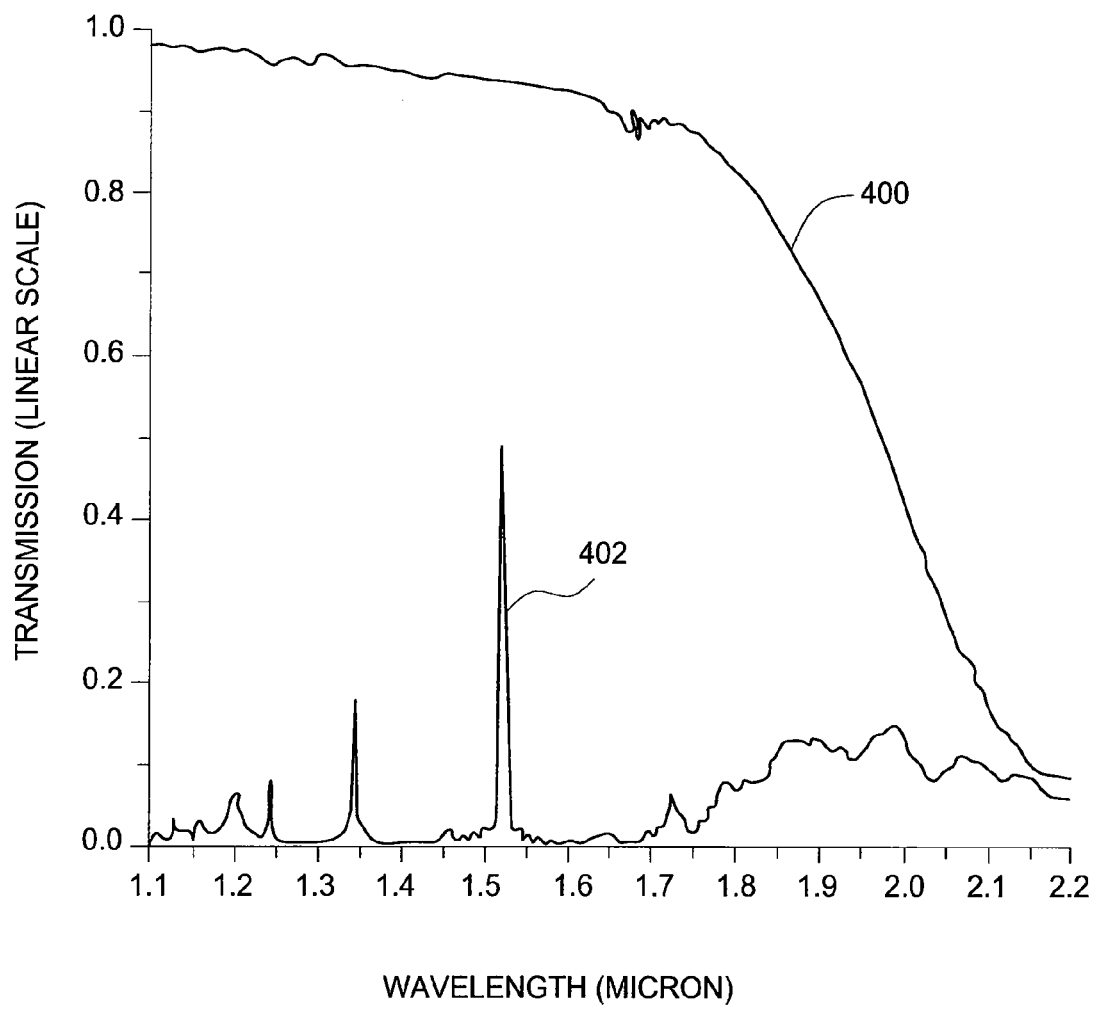
FIG. 4 is a graph illustrating the amplitude of resonance or light (in dB) versus the wavelength (in micron) for transmissions in a photonic crystal device similar to the photonic crystal device of FIG. 2, including the means to produce surface localized photonic states in the coupling region.

FIG. 4 is a graph illustrating the amplitude of resonance or light (in linear scale) versus the wavelength (in micron) for transmissions in a photonic crystal device similar to the photonic crystal device 200, including the means to produce surface localized photonic states in the coupling region 212 (e.g., an irregularly truncated lattice). Specifically, FIG. 4 illustrates the behavior of both the strip waveguide transmission 400 and the light build-up 402 in the photonic crystal circuit of the photonic crystal device.

As illustrated, the photonic crystal circuit mode (e.g., illustrated at approximately 1.53 micron) exhibits an improved resonance (e.g., having a normalized amplitude of approximately 0.45) over that of the device represented by FIG. 3 for roughly the same wavelength. This implies that the coupling between the strip waveguide and the photonic crystal circuit is much more efficient for optical filtering purposes when surface localized photonic states are introduced between the strip waveguide and the photonic crystal circuit.

Thus, the present invention represents a significant advancement in the field of photonic crystal devices. Embodiments of the invention may be effectively implemented in filtering systems including resonant cavity filtering systems to improve both the operability of the waveguide bus and coupling of the waveguide bus to an optical cavity, resulting in more effective and more efficient optical filtering. Although embodiments of the present invention have illustrated the photonic crystal circuit as an optical cavity, those skilled in the art will appreciate that the present invention may be implemented to facilitate resonant coupling to any type of photonic crystal circuit. Moreover, those skilled in the art will appreciate that the method and apparatus of the present invention may have application in other fields where the use of photonic crystal structures is advantageous, including, for example, add-drop filtering for wavelength division multiplexing.

While foregoing is directed to the preferred embodiment of the present invention, other and further embodiments of the invention may be devised without departing from the basic scope thereof, and the scope thereof is determined by the claims that follow.

The invention claimed is:

1. A method for optical filtering comprising:
   providing a photonic crystal having a layer where light is guided or is confined, said photonic crystal comprising:
   a substrate; and
   a plurality of apertures formed through said substrate, said apertures forming a periodic lattice;
   forming at least one photonic crystal circuit in said photonic crystal by omitting one or more of said plurality of apertures; and
   locally varying a surface of said photonic crystal by etching a trench in a region between said at least one photonic crystal circuit and a longitudinal side of a strip waveguide in order to produce at least one surface localized photonic state that facilitates coupling of said strip waveguide to said at least one photonic crystal circuit.

2. The method of claim 1, wherein said at least one surface localized photonic state facilitates resonant tunneling of photons from said strip waveguide to said at least one photonic crystal circuit.

3. The method of claim 1, wherein said locally varying is performed such that said surface localized photonic state is tuned in resonance with said at least one photonic crystal circuit.

4. The method of claim 1, wherein said strip waveguide operates as a waveguide bus.

5. The method of claim 1, wherein said strip waveguide has a substantially rectangular cross section.

6. The method of claim 1, wherein said strip waveguide has properties that are substantially wavelength-independent 7. The method of claim 6, wherein said strip waveguide is characterized by at least one of: a substantially linear dispersion and a broad bandwidth of low-loss propagation.

8. The method of claim 1, wherein said at least one photonic crystal circuit is an optical cavity.

9. The method of claim 1, wherein the locally varying further comprises:
   truncating at least a portion of the periodic lattice with the trench.

10. The method of claim 9, wherein the trench truncates the at least a portion of the periodic lattice in an irregular manner.

11. The method of claim 1, wherein the trench comprises an air gap.

12. The method of claim 1, wherein the trench is etched along the longitudinal side of the strip waveguide.

* * * * *